J. DESMOND.
AIR PUMP.
APPLICATION FILED DEC. 27, 1909.
985,013.
Patented Feb. 21, 1911.
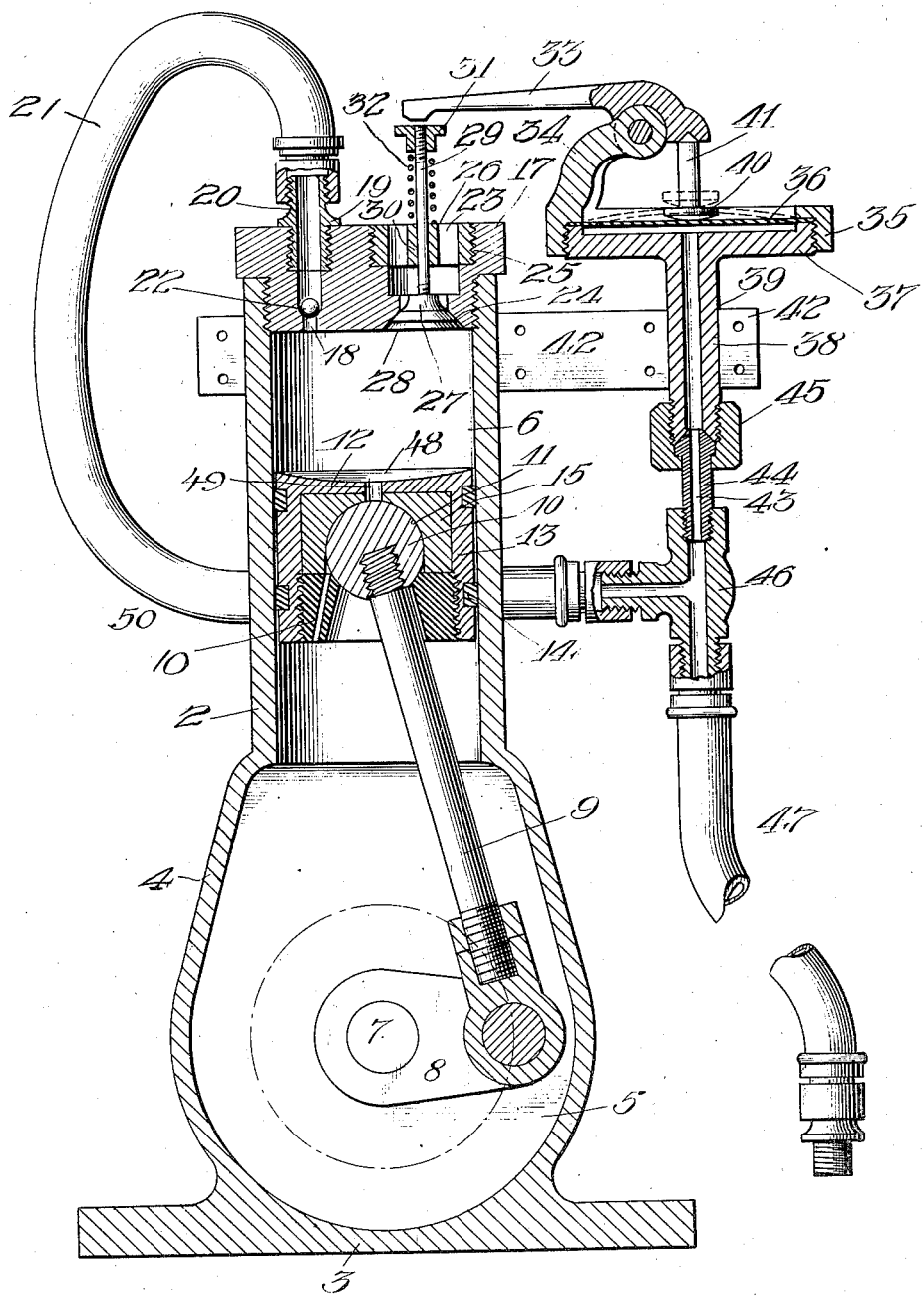
Witnesses:
Frank Blanchard
Wm. P. Bond
Inventor
John Desmond
By Banning & Banning
Attorneys.

UNITED STATES PATENT OFFICE.

JOHN DESMOND, OF CHICAGO, ILLINOIS, ASSIGNOR TO NICKEL MANUFACTURING COMPANY, OF MORRIS, ILLINOIS, A CORPORATION OF ILLINOIS.

AIR-PUMP.

985,013.  Specification of Letters Patent.  Patented Feb. 21, 1911.

Application filed December 27, 1909. Serial No. 535,053.

*To all whom it may concern:*

Be it known that I, JOHN DESMOND, a citizen of the United States, residing at Chicago, in the county of Cook and State of Illinois, have invented certain new and useful Improvements in Air-Pumps, of which the following is a specification.

This invention relates more particularly to air pumps adapted to be attached to automobiles, for the purpose of inflating the tires; and has for its object, to construct a pump, which, when it has been actuated sufficiently to accumulate a certain pressure in a storage tank or in a tire, will be automatically prevented from effecting further compression. And the invention further consists in the features of construction and combination of parts hereinafter described and claimed.

The drawing shows a cross section of a pump and cut-off mechanism therefor in operative position.

The pump consists of an outer shell or casing 2, comprising a base 3 and an upwardly extending, cylindrical portion 4, which is composed of a lower chamber 5 and an upper chamber 6. Located in the lower chamber 5 is a main driving shaft 7, driven by the motor of an automobile or by other suitable means. Attached to the shaft 7 is a crank arm 8, to the end of which is connected a piston rod 9, screw-threaded at its upper end into a ball 10 lying within a recess 11 formed in a piston head 12, the ball and recess forming an ordinary ball joint, which acts to perform the functions in the manner usual to such devices.

The piston 12 consists of an outer shell 13, provided with a plurality of packing rings 14 and an inner section 15, in which is formed the recess 11. The inner section is held in place by a nut 16, and upon the upper end of the casing 2 is a screw-threaded plug 17, provided with a passageway 18, which connects with a passageway 19 in a plug 20, and to which is attached a tube 21. Positioned in the passageway 18 is a ball valve 22, preventing the return of air into the cylinder after it has been forced out therefrom into the passageway 18. The plug 17 also has formed therein a chamber 23, which terminates, at its lower end, in a valve seat 24, and has positioned, in its upper end, a screw-threaded webbed plug 25 having a plurality of openings 26 therein, which openings and chamber form a communication between the piston chamber and the outside air, and this communication is made and broken by the movements of a valve 27, consisting of a valve member 28 resting against the seat 24 and a valve stem 29 which is mounted within a hub 30 formed in the plug 25, and is provided, on its upper end, with a thumb nut 31, between which and the hub 29 is interposed a coil spring 32.

Positioned above the thumb nut 31 is an arm 33, pivoted to an upwardly extending lug 34 formed with a diaphragm casing 35, in which rests a diaphragm member 36 held in place between a ring 37 and the inwardly extending flange of the diaphragm casing. The ring is formed upon a disk $37^a$, from which depends a stem 38, provided with a suitable passageway 39. Resting upon the diaphragm member is the head 40 of a pin 41, the end of which rests against one end of the arm 33. The stem 38 is clamped between plates 42, which surround the cylinder and are held together by bolts, or otherwise. The passage 39 communicates with a passage 43 formed in a nipple 44, and the nipple and stem 38 are joined together by a coupling nut 45. The nipple 44 is screw-threaded into one end of a T-coupling 46, to the opposite end of which is connected a hose 47 adapted to be attached to a storage tank or tire. And the T-coupling has also connected thereto the tube 21 leading from the piston chamber.

The operation is as follows: When the piston 12 is drawn downwardly, it creates a suction, which unseats the valve member 28 and draws air into the piston chamber. As the piston is moved upwardly, the air is forced through the opening 18 into the tube 21 and thence to the chamber, where it is being accumulated. This action is continued until a predetermined pressure, as eighty pounds, has been produced in the chamber, and when such pressure is reached, the diaphragm 36 will be actuated, raising the pin 41, which will swing the arm 33, causing it to depress the valve 27, unseating the valve member and establishing communication between the piston chamber and the outside air. And this communication will be established until the pressure in the chamber has been reduced below that desired. The establishing of communication between the outside air and the piston chamber, of course, prevents any further air from being forced into the tube 21. This method, which prevents further compression of the air after a certain pressure has been created within the chamber where it is being accumulated, is of great importance in the inflating of automobile tires, where an excess of pressure is liable to result in a blow-out in the tire, and the obtaining of an excess pressure is very likely to occur, since there are no means of determining by a gage, or other mechanical means, just what pressure has been obtained therein. While the pump has been described as attached to an automobile and actuated by the motor thereof, it is, of course, evident that it can be used under other conditions without departing from the spirit of the invention. As shown, the upper face of the piston is recessed to form a cup 48, into which the oil, which is scraped from the wall of the piston chamber by the piston during its movements, will collect; and communicating with the cup is an orifice 49 leading into the chamber in which the ball 10 is positioned. The oil will be worked around the periphery of the ball and finally drawn off through a passage 50, which extends through the lower face of the piston. By this means the oil will be removed from the compression chamber, so moved from the compression chamber, so that it will not be forced into the tube 21 with the air, and at the same time the ball and socket connection will receive constant lubrication. The oil forms a seal so that no air will filter through the passages in the piston head and thus reduce the efficiency of the pump.

I claim:

1. In a pump, a cylinder having a removable head provided with independent inlet and outlet passages therein, both of said passages being contracted at their inner ends to provide valve seats, a ball valve arranged within one passage and resting in its valve seat, a perforated plug detachably threaded in the outer end of the inlet passage and having a central guide hub, a valve stem slidably mounted in said hub and having a valve at its inner end normally resting in the valve seat in said inlet passage, an adjusting nut threaded on the outer end of said rod, a coiled expansion spring surrounding the rod and having its ends engaging the inner face of the nut and the outer face of the plug, respectively, a piston working in said cylinder and a delivery pipe leading from and having detachable connection with the outlet passage of said cylinder.

2. In a pump, a cylinder having a removable head provided with independent inlet and outlet passages therein, both of said passages being contracted at their inner ends to provide valve seats, a ball valve arranged within one passage and resting in its valve seat, a perforated plug detachably threaded in the outer end of the inlet passage and having a central guide hub, a valve stem slidably mounted in said hub and having a valve at its inner end normally resting in the valve seat in said inlet passage, an adjusting nut threaded on the outer end of said rod, a coiled expansion spring surrounding the rod and having its ends engaging the inner face of the nut and the outer face of the plug, respectively, a piston working in said cylinder, a delivery pipe leading from and having detachable connection with the outlet passage of said cylinder, and means independent of and detachably connected with the cylinder and having communication with the free end of said delivery pipe and acting on the outer end of the valve stem to automatically open its valve when a predetermined amount of fluid has been ejected from the cylinder for exhausting the remaining pressure in the latter.

JOHN DESMOND.

Witnesses:
Wm. P. Bond,
Ephraim Banning.